US007570570B2

(12) United States Patent
Mashimo

(10) Patent No.: US 7,570,570 B2
(45) Date of Patent: Aug. 4, 2009

(54) OPTICAL DISK DRIVE

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 523 days.

(21) Appl. No.: 11/489,058

(22) Filed: Jul. 18, 2006

(65) Prior Publication Data

US 2007/0019513 A1 Jan. 25, 2007

(30) Foreign Application Priority Data

Jul. 19, 2005 (JP) ............................ 2005-209268

(51) Int. Cl.
*G11B 7/00* (2006.01)

(52) U.S. Cl. ................................ 369/124.01; 369/47.1

(58) Field of Classification Search ............. 369/44.13, 369/47.17, 47.19, 47.22, 53.22, 53.34, 59.17, 369/59.18, 59.25, 124.01

See application file for complete search history.

(56) References Cited

U.S. PATENT DOCUMENTS

| | | | | |
|---|---|---|---|---|
| 7,099,244 | B2 * | 8/2006 | Nakata et al. | 369/47.19 |
| 7,120,110 | B2 * | 10/2006 | Mashimo | 369/124.01 |
| 7,221,629 | B2 * | 5/2007 | Hayashi et al. | 369/47.22 |
| 2004/0071057 | A1 | 4/2004 | Ohta | |
| 2004/0165497 | A1 * | 8/2004 | Hirayama | 369/47.31 |

FOREIGN PATENT DOCUMENTS

| | | | |
|---|---|---|---|
| JP | 2004-095181 | A | 3/2004 |
| JP | 2004-134002 | A | 4/2004 |
| JP | 2005-4889 | A | 1/2005 |

OTHER PUBLICATIONS

Notice of Grounds for Rejection (JP) dated Mar. 18, 2008, issued in corresponding Japanese Application No. 2005-209268.

* cited by examiner

*Primary Examiner*—Hoa T Nguyen
*Assistant Examiner*—Jesse Hauck
(74) *Attorney, Agent, or Firm*—Christensen O'Connor Johnson Kindness PLLC

(57) ABSTRACT

An address is reliably demodulated when a phase shift in a wobble signal has been induced by a crosstalk signal from an adjacent track. Address information is modulated by a binary phase modulation scheme and embedded into an optical disk as a wobble signal. A 0-degree phase wobble signal and a 180-degree phase wobble signal are brought out of phase with each other by crosstalk from an adjacent track. An address decoder performs exclusive-OR operation of the wobble signal and a reference clock signal, to thus compute a ratio at which an exclusive-OR result assumes a value of 1 (H) every half period of the reference clock signal. The thus-computed ratio is compared with a threshold ratio. The threshold ratio is usually set to 50%. However, when a phase shift has been caused by crosstalk, a system controller changes the threshold ratio to a ratio of 50% or less.

11 Claims, 4 Drawing Sheets

OPTICAL DISK DRIVE

PRIORITY INFORMATION

This application claims priority to Japanese Patent Application No. 2005-209268 filed on Jul. 19, 2005, which is incorporated herein by reference in its entirety.

BACKGROUND OF THE INVENTION

1. Technical Field

The present invention relates to an optical disk drive, and more particularly to a technique for compensating for a phase shift in a wobble signal ascribable to crosstalk originating from adjacent tracks.

2. Related Art

In an optical disk such as a DVD+R/+RW, an HD DVD-R/-RW, or the like, a wobble signal is recorded by means of wobbling a groove. The wobble signal is modulated and recorded by means of a two-phase modulation mode employing a phase value of 0° and a phase value of 180°. Since the wobble signal is used for controlling the rotation speed of an optical disk or modulation of an address, the optical disk drive must extract a wobble signal from a signal reproduced by an optical pickup without fail.

In order to increase recording density, track pitches of an optical disk are formed so as to become sequentially narrower. A portion of a beam spot is radiated on an adjacent track as well as on a target track. As a result, crosstalk originates from the adjacent track. A detected wobble signal tends to become a signal where a wobble signal of an adjacent track is superimposed on a wobble signal of the target track.

When a wobble signal is subjected to binary phase modulation, the influence of crosstalk is not uniform and varies with a relationship between the phase of the wobble signal of the target track and the phase of the wobble signal of the adjacent track. Specifically, when the target track and an adjacent track are in phase with each other, amplitudes of detected wobble signals reinforce each other, to thus become greater. In contrast, when the wobble signal of the target track and the wobble signal of an adjacent track are out of phase with each other, the amplitudes of the detected wobble signals weaken each other, to thus become smaller. In addition to the changes in the amplitude of the wobble signal, a shift also arises in the phase of the wobble signal under influence of crosstalk.

FIG. 4 shows a waveform of a basic wobble signal (a wobble signal which is not affected by the crosstalk signal), a waveform of a crosstalk signal, a waveform of a 0-degree phase wobble signal affected by the crosstalk signal, and a waveform of a 180-degree phase wobble signal affected by the crosstalk signal. In the drawing, the horizontal axis represents time, and the vertical axis represents amplitude. The phase of the 0-degree phase wobble signal appearing in a segment A in the drawing is advanced by the crosstalk signal, and the phase of the 180-degree phase wobble signal appearing in a segment B is delayed by the crosstalk signal. Consequently, the wobble signal is originally demodulated at a phase value of 0 degree or 180 degrees. However, the phase of the wobble signal is shifted from a value of 0 degree or a value of 180 degrees, and hence difficulty is encountered in demodulating the wobble signal.

For instance, in Japanese Patent Laid-Open Publication No. 2005-4889, fluctuations in the amplitude of a wobble signal attributable to crosstalk are corrected by use of two amplifiers; namely, a fixed gain amplifier and variable gain amplifier.

When the phase of a wobble signal is detected, it is better to generate a reference clock signal from the wobble signal by means of a PLL circuit and compare the phase of the wobble signal and the phase of the reference clock signal. For instance, an exclusive-OR (EX-OR) result of the wobble signal and the reference clock signal is computed, and a determination is made as to whether or not the result assumes a value of 0 or 1, thereby determining whether or not the phase of the wobble signal is 0 degree or 180 degrees. In short, when the exclusive-OR result assumes a value of 0, the phase of the wobble signal is determined to be a value of 0 degree. When the exclusive-OR result assumes a value of 1, the phase of the wobble signal is determined to be 180 degrees.

However, as shown in FIG. 4, when crosstalk originating from an adjacent track is superimposed on the wobble signal, the phase of the 0-degree phase wobble signal and the phase of the 180-degree phase wobble signal are shifted, so that the value of exclusive-OR result changes in a complicated manner. Specifically, on the assumption that the period of a reference clock signal is taken as a reference, the exclusive-OR result assumes a value of 0 or 1 in a one-half period of the reference clock signal unless there is a phase shift. However, when there is phase shift, the exclusive-OR result assumes both a value of 0 and a value of 1 in one-half period of the reference clock signal. If there is no phase shift, the ratio of a value of 0 or 1 achieved in one-half the period of the reference clock is 100%. However, when there is a phase shift, the ratio decreases. A determination as to whether the phase of the wobble signal is 0 degree or 180 degrees can be usually made by means of taking a phase value of 90 degrees (a ratio of 50%) as a criterion for determination. When the phase value is less than 90 degrees, the phase can be determined to assume a value of 0 degree. When the phase value is in excess of 90 degrees, the phase can be determined to assume a value of 180 degrees. However, occurrence of phase shift leads to a decrease in the accuracy of determination.

SUMMARY OF THE INVENTION

The present invention provides an optical disk drive capable of demodulating a wobble signal with high accuracy even when the phase of the wobble signal has been shifted by crosstalk originating from an adjacent track.

The present invention provides an optical disk drive for demodulating a wobble signal modulated by a modulation scheme which expresses a data value by means of a first phase and a second phase that is out of phase with the first phase by 180 degrees, the drive comprising:

reproduction means for reproducing the wobble signal;

binarization means for binarizing the wobble signal;

computation means for computing an exclusive-OR result from the binarized wobble signal and a reference clock signal;

determination means for determining whether or not the wobble signal is of the first phase or the second phase every period of the reference clock signal by means of comparing a ratio, at which the exclusive-OR result assumes a value of one, with a predetermined threshold ratio in a half period of the reference clock signal; and control means for changing the predetermined threshold ratio when crosstalk originating from an adjacent track is superimposed on the wobble signal.

In one embodiment of the present invention, the control means changes the predetermined threshold ratio to a ratio of 50% or less.

According to the present invention, a threshold ratio used for determining whether the wobble signal is of the first phase or the second phase is not fixed but made variable. As a result, even when the phase of the wobble signal has been shifted by crosstalk, the accuracy of determination can be maintained.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail by reference to the following figures, wherein.

DETAILED DESCRIPTION OF THE PREFERRED EMBODIMENT

An embodiment of the present invention will be described hereinbelow.

Figure 1:
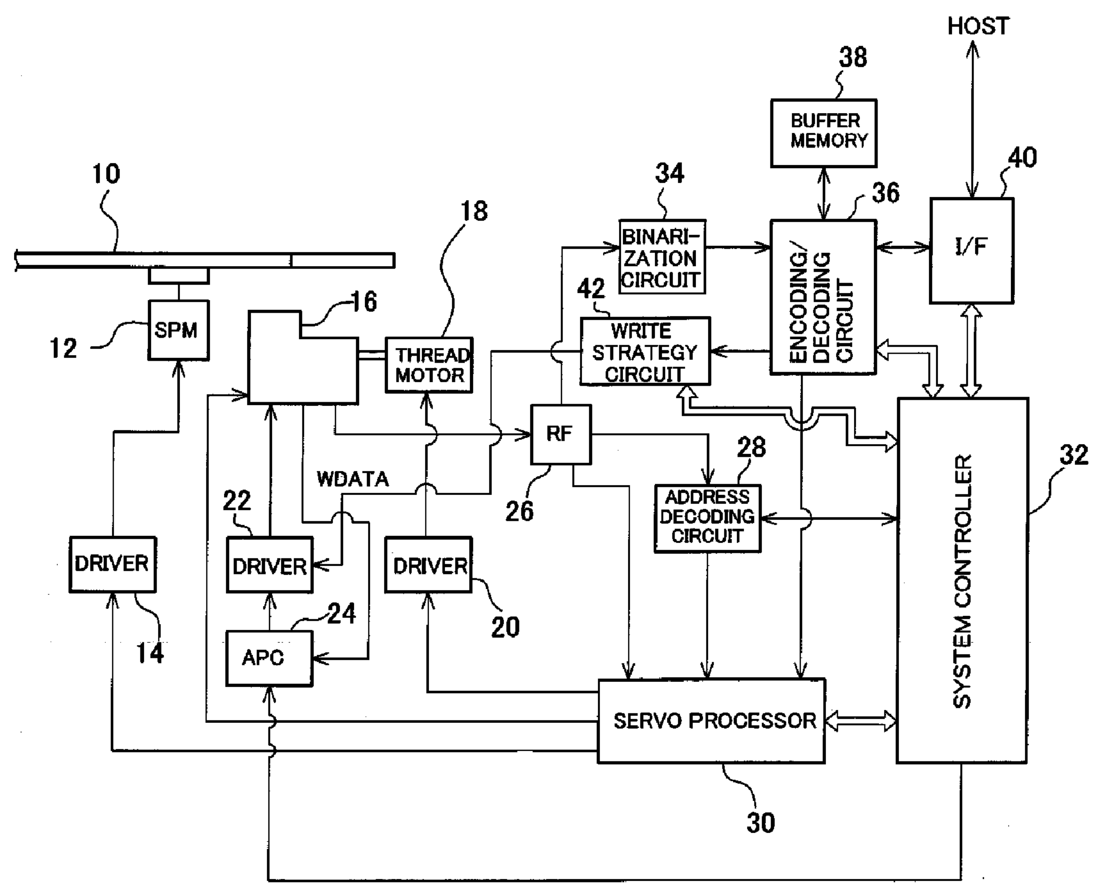
FIG. 1 is a block diagram showing the configuration of an optical disk drive.

FIG. 1 shows the overall configuration of an optical disk drive of the present embodiment. An optical disk 10 is rotationally driven by a spindle motor (SPM) 12. The spindle motor SPM 12 is driven by a driver 14, and the driver 14 is servo-controlled by a servo processor 30 so as to attain a desired rotational speed. One example of the optical disk 10 is an HD DVD-R. However, the present invention can also be applied to another optical disk; e.g., a Blue-ray disk.

An optical pickup 16 includes a laser diode (LD) used for radiating a laser beam onto the optical disk 10, and a photodetector (PD) which receives light reflected from the optical disk 10 and converts the thus-received light into an electrical signal. The optical pickup 16 is disposed opposite the optical disk 10. The optical pickup 16 is driven by a threadmotor 18 in the radial direction of the optical disk 10, and the thread motor 18 is driven by a driver 20. Like the driver 14, the driver 20 is servo-controlled by the servo processor 30. The LD of the optical pickup 16 is driven by a driver 22, and the driver 22 is controlled by an automatic power control circuit (APC) 24 such that a drive current assumes a desired value. The APC 24 controls a drive current of the driver 22 such that optimal recording power, which has been selected by means of OPC (Optimum Power Control) performed in a test area (PCA) of the optical disk 10, is acquired. OPC corresponds to processing for: recording test data in the PCA of the optical disk 10 by means of changing recording power in a plurality of steps; reproducing the test data to evaluate signal quality of the test data; and selecting recording power at which desired signal quality is acquired. A $\beta$ value, a $\gamma$ value, the degree of modulation, a jitter, or the like, is used as an index of signal quality.

When the data recorded on the optical disk 10 are reproduced, the laser beam of reproducing power is emitted from the LD of the optical pickup 16, and the resultant reflected light is converted into an electric signal by the PD. The thus-converted electrical signal is output. A reproduced signal output from the optical pickup 16 is supplied to an RF circuit 26. The RF circuit 26 generates a focus error signal and a tracking error signal from the reproduced signal, and supplies the signals to the servo processor 30. On the basis of these error signals, the servo processor 30 servo-controls the optical pickup 16, thereby maintaining the optical pickup 16 in an on-focus state and an on-track state.

The optical pickup 16 records or reproduces data to or from a groove of the optical disk 10. A groove is helically formed in an optical disk 10. The RF circuit 26 supplies to an address decoding circuit 28 an address signal included in the reproduced signal. The address decoding circuit 28 has a PLL circuit; generates a reference clock signal from the wobble signal to thereby demodulate address data pertaining to the optical disk 10; and supplies the thus-demodulated address data to the servo processor 30 and a system controller 32. The optical disk 10 includes a segment address and a track address as address data. The address data are subjected to phase modulation. A bit value of 0 is expressed by four 0-degree phase waveforms, and a bit value of 1 is expressed by four 180-degree phase waveforms. These four in-phase waveforms form a redundant system.

The RF circuit 26 supplies a reproduced RF signal to a binarization circuit 34. The binarization circuit 34 binarizes the reproduced signal, and supplies the resultantly-produced signal to an encoding/decoding circuit 36. The encoding/decoding circuit 36 subjects the binarized signal to demodulation and error correction to thus produce reproduced data; and outputs the thus-reproduced data to a host apparatus, such as a personal computer, by way of an interface I/F 40. When the reproduced data are output to the host apparatus, the encoding/decoding circuit 36 outputs the reproduced data after having temporarily stored the same in buffer memory 38.

When data are recorded on the optical disk 10, data to be recorded, which have been input by way of the host apparatus, are supplied to the encoding/decoding circuit 36 by way of the interface I/F 40. The encoding/decoding circuit 36 stores in the buffer memory 38 the data to be recorded; encodes the data to be recorded; and supplies the thus-encoded data to a write strategy circuit 42 as modulated data [ETM (Eight-to-Twelve Modulation) modulated]. The write strategy circuit 42 converts the modulated data into multiple pulses (a pulse train) in accordance with a predetermined recording strategy, and supplies the thus-converted multiple pulses to the driver 22 as recording data. The recording strategy is formed from, e.g., a pulse width of a leading pulse or a pulse width of a subsequent pulse in the multiple pulses, a pulse duty, and the like. In the present embodiment, the recording strategy affects recording quality and, hence, is usually fixed to a certain optimum strategy. The recording strategy may be set along with OPC. The laser beam whose power has been modulated by the recording data is emitted from the LD of the optical pickup 16, whereupon data are recorded on the optical disk 10. After the data have been recorded, the optical pickup 16 emits a laser beam of reproduction power to thereby reproduce the recorded data, and supplies the thus-reproduced data to the RF circuit 26. The RF circuit 26 supplies the reproduced signal to the binarization circuit 34, and supplies the binarized EFM data to the encoding/decoding circuit 36. The encoding/decoding circuit 36 decodes the modulated data, and verifies the thus-decoded data against the recorded data stored in the buffer memory 38. A result of verification is supplied to the system controller 32. In accordance with the result of verification, the system controller 32 determines whether to successively record data or to carry out alternation processing.

By means of such a configuration, when, in order to record/reproduce data in/from the groove, a groove track is traced to thus detect an address from the wobble signal by means of the address decoder circuit 28 and the thus-detected address is supplied to the system controller 32, four in-phase waveforms can be consecutively detected in the case of normal reading operation. In this case, a bit value can be determined as 0 or 1 in accordance with the phase of the waveforms. However, when accurate detection of the 0-degree phase waveform or the 180-degree phase waveform has failed, there is a risk of occurrence of a failure to read address information. When a CRC inspection bit is included in the address information in the optical disk as in the case of the HD DVD-R, the read address information is processed to thus determine whether or not the information coincides with the CRC inspection bit. If no coincidence is found, the read address information will become an error. CRC is a known technique. Data to be inspected are considered to be binary data, and the data are processed by a formula called a generator polynomial, to thereby generate an inspection bit corresponding to a given number of bits. The inspection bit is added to the data to be inspected. The process at the demodulation end generates data to be inspected, and processes the data by means of a generator polynomial to thus determine whether or not the data coincide with the inspection bit. Thus, existence of an error is determined. The parity bit is a CRC inspection bit corresponding to one bit and which enables detection of a one-bit error. When the CRC inspection bit is assumed to correspond to nine bits, an error of three bits or less can be detected. Since the identity of the bit that includes an error in uncertain, the error cannot be corrected. Especially, when address information is formed from 24 bits and 9-bit parity, retrieval of all possible combinations thereof is not realistic.

In the present embodiment, in order to detect as accurately as possible that the phase of the wobble signal is 0 degree or 180 degrees even when the phase shift has arisen under influence of crosstalk originating from an adjacent track to thus prevent a decoding failure, a determination criterion value used for determining whether the phase is 0 degree or 180 degrees is adaptively altered. As mentioned previously, a determination as to whether the phase of the wobble signal is 0 degree or 180 degrees can be readily made by means of: computing an exclusive-OR result of the wobble signal and the reference clock signal generated by the PLL circuit; and determining whether the computed value is 0 or 1. A ratio at which the value of the exclusive-OR result achieved during a half period of the reference clock signal assumes 0 or 1 is computed. When the ratio is less than 50%, the phase can be determined to be 0. When the phase is in excess of 50%, the phase can be determined to be 180 degrees. However, when the phase of the wobble signal shifts from 0 degree or 180 degrees under influence of crosstalk, the ratio of the exclusive-OR result varies. When 50% is fixed as a ratio used for rendering a determination, the phase cannot be determined correctly. In connection with a 0-degree phase wobble signal, servo-control is performed in a phase extremely close to the phase of the reference clock signal by means of phase lock of the PLL circuit, and hence no substantial problems arise in relation to the determination of a phase value of 0 degree. Consequently, a shift of the phase of the 180-degree phase wobble signal will now be described.

Figure 2:
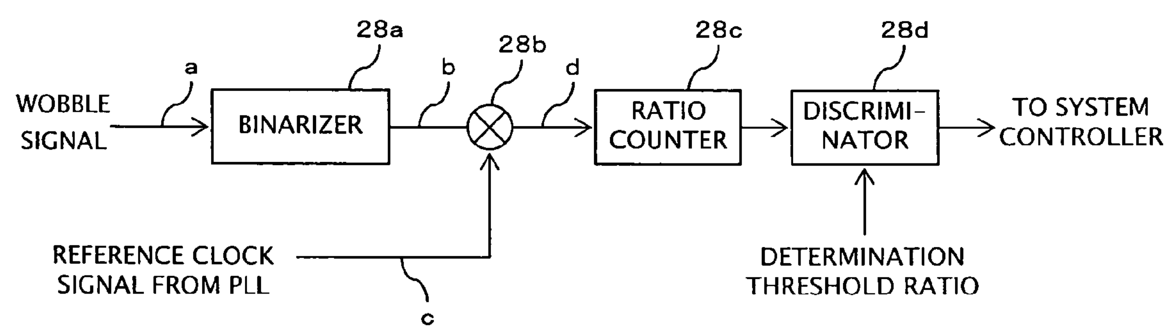
FIG. 2 is a block diagram showing the configuration of a phase detection circuit in an address decoder.
Figure 3:
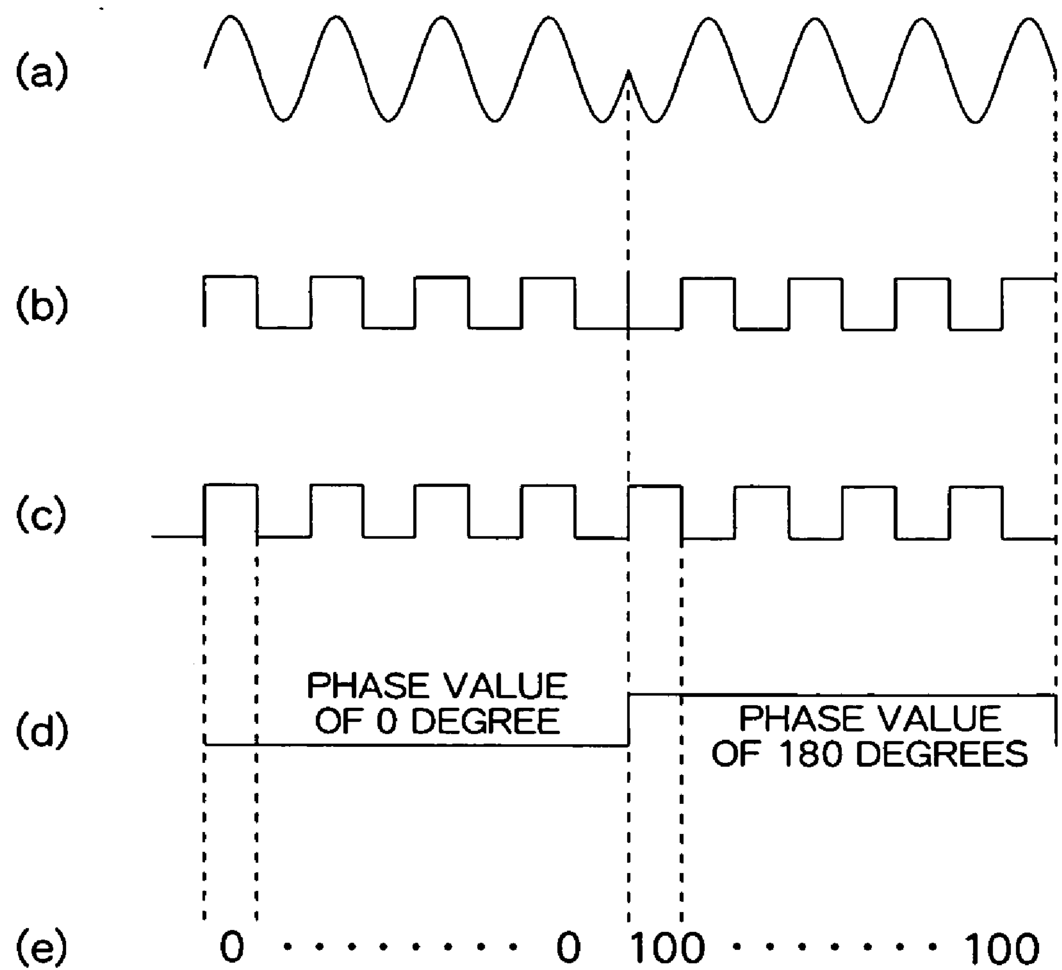
FIG. 3 is a descriptive view showing a relationship between a wobble signal, a reference clock signal, and a result of exclusive-.
Figure 4:
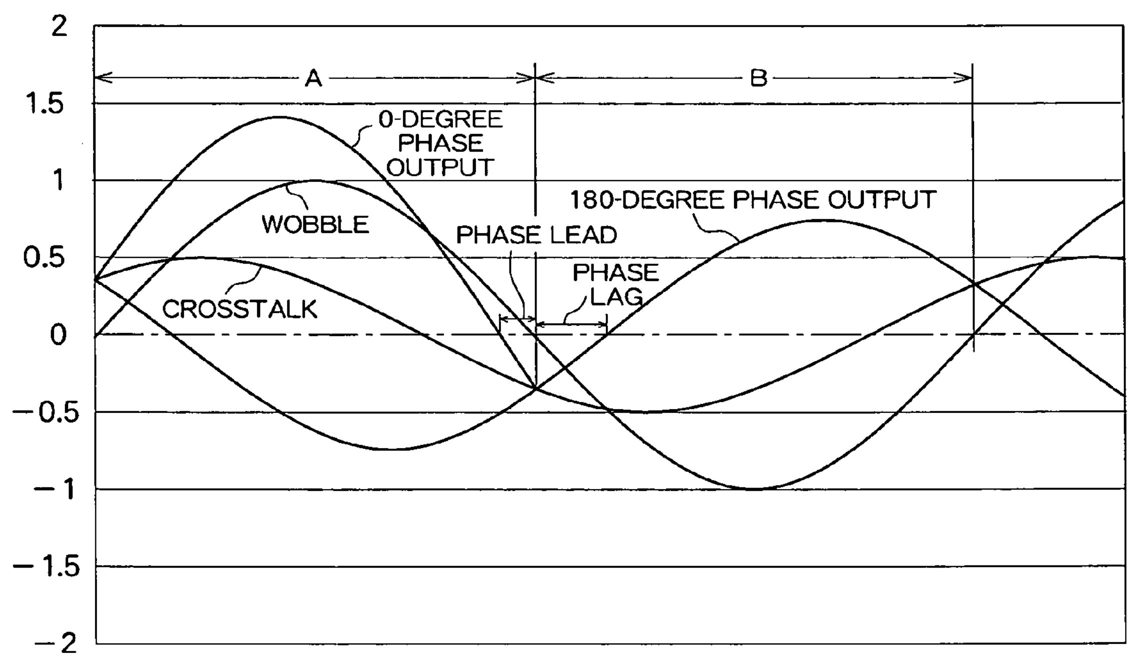
FIG. 4 is a graph showing phase shifts induced by crosstalk.

FIG. 2 shows a phase detection circuit in the address decoder 28. FIG. 3 shows a timing chart of individual sections shown in FIG. 2. The detection circuit comprises a binarizer 28*a* for binarizing a wobble signal extracted from an RF signal; an exclusive-OR (EOR) gate 28*b*; a ratio counter 28*c*; and a discriminator 28*d*. The exclusive-OR gate 28*b* computes an exclusive-OR result from a binarized wobble signal and a reference clock signal output from the PLL circuit. The ratio counter 28*c* measures a ratio of the width of an H (high level) pulse of the exclusive-OR result achieved in a half period of the reference clock signal to the entire pulse width. The discriminator 28*d* compares the ratio measured by the ratio counter 28*c* with a determination threshold ratio, to thus determine whether the phase is 0 degree or 180 degrees. The result of determination is supplied to the system controller 32. A determination threshold ratio employed by the discriminator 28*d* is adaptively set by the system controller 32.

FIG. 3A shows an input wobble signal. FIG. 3B shows a binarized wobble signal. FIG. 3C shows a reference clock signal output from the PLL circuit. The reference clock signal also acts as a reference signal used as a criterion for determining a phase. FIG. 3D shows a signal output from the exclusive-OR gate 28*b*. When the binarized wobble signal and the reference clock signal are H or L, the output signal become low. When either of the binarized wobble signal and the reference clock signal is high and the remaining one is low, the output signal becomes high. FIG. 3E shows a ratio at which the exclusive-OR result achieved during the half period of the reference clock signal becomes high. In the case of a phase value of 0 degree, the ratio at which the exclusive-OR result becomes high is 0%. In the case of a phase value of 180 degrees, the ratio at which the exclusive-OR result becomes high is 100%. Consequently, the determination threshold ratio is usually set to 50%, and the ratio at which the exclusive-OR result becomes high is compared with 50%. When the ratio is less than 50%, the phase can be determined to be 0 degree. When the ratio is in excess of 50%, the phase can be determined to be 180 degrees.

In the meantime, when crosstalk originating from an adjacent track is present, the ratio at which the exclusive-OR result becomes high shifts from 100% (in relation to a phase value of 0 degree, phase lock is effected, and hence the ratio is close to 0%). The system controller 32 detects fluctuations in the amplitude of the wobble signal and presence/absence of crosstalk from an envelope. When crosstalk exists, the determination threshold ratio is changed from 50% to, e.g., 33%. Changing the determination threshold value from 50% to 33% signifies the change of the phase to be determined from 90 degrees to 60 degrees. The change of the determination threshold ratio will be described in more detail.

The ratio of the level of the wobble signal to the level of the crosstalk signal is derived by the following equations defined by standards.

$$\text{Wobblemaxpp/Wobbleminpp} \leqq 2.3 \text{(HD DVD standard)}$$

$$\text{Wobblemaxpp/Wobbleminpp} \leqq 2.6 \text{(DVD+R standard)}$$

$$\text{Wobblemaxpp/Wobbleminpp} \leqq 2.2 \text{(Blue-ray standard)}$$

Wobblemaxpp is a maximum peak width of amplitude of a wobble signal, and Wobbleminpp is a minimum peak width of amplitude of a wobble signal. When the phase of the crosstalk signal coincides with the phase of the wobble signal, the amplitude of the wobble signal reaches a maximum at a ratio of 2.3. The amplitude of the wobble signal reaches a minimum when the phase of the crosstalk signal is inverted in relation to the phase of the wobble signal. Therefore, the ratio A of crosstalk is determined as follows $$(1+A)/(1-A)=2.3.$$

In this case, A assumes a value of 0.3939. The phase achieved at such an amount of phase shift depends on a difference between the phase of the wobble signal and the phase of the crosstalk signal.

In the case of a phase difference assuming a value of 0 degree: no phase shift

In the case of a phase difference assuming a value of ±90 degree: the phase shift is maximum In the case of a phase difference assuming a value of ±180 degree: no phase shift The amount of phase shift achieved at A=0.3939 assumes a value of about ±43 degrees. Specifically, on the assumption that the wobble signal is taken as M sin θ and a crosstalk component is taken as N(sin θ+α), a detected wobble signal is defined as $M \sin \theta + N \sin(\theta+\alpha) = \{(M+N \cos \alpha)^2 + (N \sin \alpha)^2\}^{1/2} \cdot \sin(\theta+\beta)$, where $\beta = \tan^{-1}\{N \sin \alpha/(M+N \cos \alpha)\}$. At cos α=0 and sin α=±1, a phase angle β reaches a maximum. At this time, $\beta = \tan^{-1}(N/M)$ is achieved.

In the meantime, M+N is maximum, and M−N is minimum. Hence, an amplitude ratio of (M+N)/(M−N) is obtained. When (M+N)/(M−N)=2.3 is achieved, N/M=A=0.3939 is derived. Accordingly, we have $\beta = \tan^{-1}(N/M) = \tan^{-1}(0.3939) = 21.4994$ degrees. Since the 0-degree phase section and the 180-degree phase section are inverted from each other in terms of an angle, the phase shift becomes 43 degrees, which is a double 21.5 degrees. When the phase shift is about 43 degrees, a phase value of 180 degrees, which is to be achieved originally, is shifted to 137 degrees or 223 degrees. Therefore, the system controller 32 changes the determination threshold phase from 90 degrees to 137 degrees/2=68.5 degrees. When converted into a ratio of the exclusive-OR result, the value corresponds to 68.5/180×100=38.05%. The system controller 32 supplies 38.05% rather than 50% to the discriminator *28d* of the address decoder. When the ratio of the exclusive-OR result is less than 38.05%, the discriminator *28f* determines the phase as 0 degree. When the ratio of the exclusive-OR result is in excess of 38.05%, the discriminator *28f* determines the phase as 180 degrees. Thus, even when a phase shift has arisen in the 180-degree phase wobble signal, the determination threshold ratio is also shifted toward 0 degree in accordance with the phase shift. Hence, a 180-degree phase can be demodulated without fail.

In the present embodiment, the system controller 32 detects presence/absence of crosstalk. When crosstalk has been detected, the determination threshold ratio is changed from 50% to 33% or 38.05%. However, when the track pitch is narrow, crosstalk is assumed to exist almost without fail, and the determination threshold ratio may be changed from about 33% or 38.05% at the outset.

In an optical disk drive which performs retry processing when an address cannot be decoded, the determination threshold ratio maybe altered, at the outset, to about 33% during retry processing. Specifically, 50% is set as a default determination threshold ratio at the outset. When an address cannot be demodulated, the influence of crosstalk is assumed to exist. During retry processing, the determination threshold ratio is changed from 50% to 33% (or 38.05%).

What is claimed is:

1. An optical disk drive for demodulating a wobble signal modulated by a modulation scheme which expresses a data value by means of a first phase and a second phase out of phase with the first phase by 180 degrees, the drive comprising:

reproduction means for reproducing the wobble signal;

binarization means for binarizing the wobble signal;

computation means for computing an exclusive-OR result from the binarized wobble signal and a reference clock signal;

determination means for determining whether or not the wobble signal is of the first phase or the second phase every period of the reference clock signal by means of comparing a ratio, at which the exclusive-OR result assumes a value of one, with a predetermined threshold ratio in a half period of the reference clock signal; and control means for changing the predetermined threshold ratio when crosstalk originating from an adjacent track is superimposed on the wobble signal.

2. The optical disk drive according to claim 1, wherein the control means changes the predetermined threshold ratio to a ratio of 50% or less.

3. The optical disk drive according to claim 1, wherein the first phase assumes a value of 0 degree; the second phase assumes a value of 180 degrees; and the determination means determines the phase to be 0 degree when the ratio, at which the exclusive-OR result assumes a value of one, is less than the predetermined ratio, and determines the phase to be 180 degrees when the ratio is in excess of the predetermined ratio.

4. The optical disk drive according to claim 3, wherein, when an address cannot be demodulated, the control means changes the predetermined threshold ratio from a default value of 50% to a value of 50% or less.

5. An optical disk drive comprising:

an optical pickup which radiates a laser beam onto an optical disk, receives light reflected from the optical disk, and outputs the received light as a reproduced signal;

a binarization circuit for binarizing a wobble signal included in the reproduced signal output from the optical pickup;

a PLL circuit for generating a reference clock signal from the reproduced signal output from the optical pickup;

a comparator circuit for comparing a phase of a binarized wobble signal from the binarization circuit and a phase of a reference clock signal from the PLL circuit;

a ratio counter for measuring a ratio of a duration in which the phase of the binarized wobble signal differs from the phase of the reference clock signal during a half period of the reference clock signal, to an entire pulse width; and a discriminator for comparing the ratio measured by the ratio counter with a determination threshold ratio, to thus determine whether the phase is 0 degree or 180 degrees, wherein the determination threshold ratio is incremented or decremented through adjustment in accordance with the amount of crosstalk.

6. The optical disk drive according to claim 5, wherein the comparator circuit includes an exclusive-OR element.

7. The optical disk drive according to claim 5, wherein the determination threshold ratio is set to a value of 50% when no crosstalk is present but is set to a value of less than 50% when crosstalk is present.

8. The optical disk drive according to claim 5, wherein the determination threshold ratio is set to a smaller value as the amount of crosstalk increases.

9. An optical disk drive comprising:

an optical pickup which radiates a laser beam onto an optical disk, receives light reflected from the optical disk, and outputs the received light as a reproduced signal;

a binarization circuit for binarizing a wobble signal included in the reproduced signal output from the optical pickup;

a PLL circuit for generating a reference clock signal from the reproduced signal output from the optical pickup;

a comparator circuit for comparing a phase of a binarized wobble signal from the binarization circuit and a phase of a reference clock signal from the PLL circuit;

a ratio counter for measuring a ratio of a duration in which the phase of the binarized wobble signal differs from the phase of the reference clock signal during a half period of the reference clock signal, to an entire pulse width; and a discriminator for comparing the ratio measured by the ratio counter with a determination threshold ratio, to thus determine whether the phase is 0 degree or 180 degrees, wherein the determination threshold ratio is adjusted so as to become smaller when an address cannot be demodulated in accordance with the binarized wobble signal.

10. The optical disk drive according to claim 9, wherein the comparator circuit includes an exclusive-OR element.

11. The optical disk drive according to claim 9, wherein the determination threshold ratio is set to a value of 50% as a default value, but is set to a value of less than 50% when the address cannot be demodulated.

* * * * *

UNITED STATES PATENT AND TRADEMARK OFFICE

CERTIFICATE OF CORRECTION

| | | |
|---|---|---|
| PATENT NO. | : 7,570,570 B2 |  |
| APPLICATION NO. | : 11/489058 | |
| DATED | : August 4, 2009 | |
| INVENTOR(S) | : Akira Mashimo | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Seventh Day of September, 2010

David J. Kappos

*Director of the United States Patent and Trademark Office*